United States Patent [19]

Naarmann et al.

[11] Patent Number: 5,530,087
[45] Date of Patent: Jun. 25, 1996

[54] POLYANILS

[75] Inventors: Herbert Naarmann, Wattenheim; Rudolf Gompper, Munich; Thomas Mueller, Aystetten, all of Germany

[73] Assignee: BASF Aktiengesellschaft

[21] Appl. No.: 347,367

[22] PCT Filed: May 25, 1993

[86] PCT No.: PCT/EP93/01303

§ 371 Date: Dec. 2, 1994

§ 102(e) Date: Dec. 2, 1994

[87] PCT Pub. No.: WO93/25603

PCT Pub. Date: Dec. 23, 1993

[30] Foreign Application Priority Data

Jun. 6, 1992 [DE] Germany .................. 42 18 766.4

[51] Int. Cl.⁶ .................................................. C08G 73/00
[52] U.S. Cl. .................... 528/208; 528/229; 528/332; 528/318; 528/312; 528/422
[58] Field of Search .................... 528/207, 208, 528/422, 312, 318, 322, 229, 332

[56] References Cited

FOREIGN PATENT DOCUMENTS 21310426  3/1976  France .
1080526  8/1976  United Kingdom .

OTHER PUBLICATIONS

Handbook of Polymer Synthesis, Part B, Ed. Kricheldorf (1992), Naarmann et al., 1353–1435.

Patent Abstracts of Japan vol. 10, 28 (C-326) (2085) Feb. 4, 1986—JP 60 181 127.

*Primary Examiner*—Jeffrey Mullis
*Attorney, Agent, or Firm*—Keil & Weinkauf

[57] ABSTRACT

Polyanils of the general formula

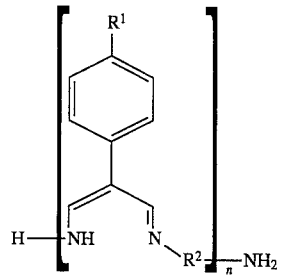

where $R^1$ is $C_1$–$C_{24}$-alkyl, $C_1$–$C_{24}$-alkoxy, Cl, Br, $CF_3$ or $NO_2$,
$R^2$ is para-phenylene, a fused aromatic ring system of 10 to 30 carbon atoms or

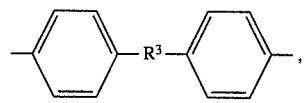

$R^3$ is a chemical bond, S, O, NH, $CH_2$, CH=CH, CO, SO or SS and
n is an integer from 5 to 100, and their acid addition salts of the general formula II

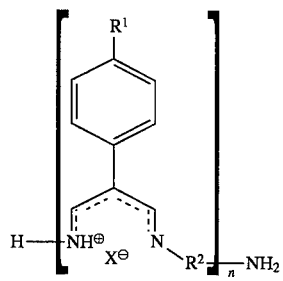

where $X^-$ is $ClO_4^-$, $BF_4^-$, $AsF_6^-$ or

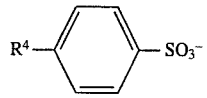

and $R_4$ is $C_1$—$C_8$-alkyl are disclosed. The polyanils are useful as electrically conductive materials and for nonlinear optical purposes.

11 Claims, No Drawings

POLYANILS

DESCRIPTION

The present invention relates to polyanils of the general formula

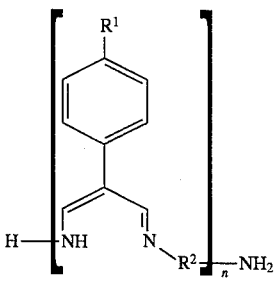

I where $R^1$ is $C_1$–$C_{24}$-alkyl, $C_1$–$C_{24}$-alkoxy, Cl, Br, $CF_3$ or $NO_2$, $R^2$ is para-phenylene, a fused aromatic ring system of 10 to 30 carbon atoms or

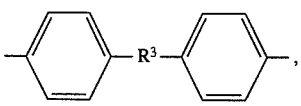

$R^3$ is a chemical bond S, O, NH, $CH_2$, CH=CH, CO, SO or SS, and n is an integer from 5 to 100, and their acid addition salts of the general formula II

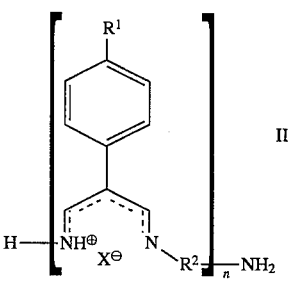

II where $X^-$ is $ClO_4^-$, $BF_4^-$, $AsF_6^-$ or

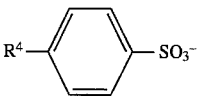

and $R^4$ is $C_1$–$C_8$-alkyl.

The present invention furthermore relates to processes for the preparation of these polyanils and to their use as electrically conductive materials and for nonlinear optical purposes.

The Handbook of Polym. Synthesis, Part B, 1390 (1992), edited by H. R. Kricheldorf, Marcel Dekker, New York, discloses that aniline can be converted by oxidation into aniline black, also referred to as polyaniline. However, these polymers are not homogeneous and, in addition to the units of the type

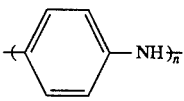

also contain quinoid structures, and these products are furthermore contaminated by other oxidation products and, owing to their poor solubility or insolubility, are virtually impossible to purify and characterize exactly.

It is an object of the present invention to provide polymer systems which do not have these disadvantages and have extensive π conjugation.

We have found that this object is achieved, according to the invention, by the polyanils defined at the outset. We have also found processes for the preparation of these polyanils and their use as electrically conductive and nonlinear optical materials.

Preferred polyanils of the general formula I are the compounds in which $R^1$ is a solubilizing group, in particular $C_1$–$C_{13}$-alkyl or $C_1$–$C_{13}$-alkoxy. $R^2$ is preferably para-phenylene, naphthylene, anthracylene or

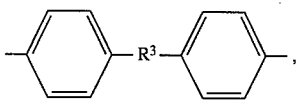

and $R^3$ is S, NH or CH=CH. Para-phenylene is particularly preferred. n is preferably from 10 to 50.

In the case of the acid addition salts of the general formula II, preferred compounds are those in which $R_1$, $R_2$, $R_3$ and n have the meanings stated as being preferred in the case of the polyanils of the general formula I. The anion $X^-$ is in particular $ClO_4^-$ or

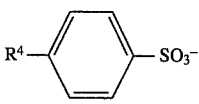

and $R^4$ is preferably $C_1$–$C_4$-alkyl.

The novel polyanils can be prepared by a method in which, in a first step, a compound of the general formula III

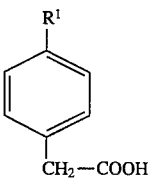

III is subjected to a Vilsmeier-Haack-Arnold reaction to give an amidine which is converted in a second step, by the addition of an aromatic diamine, into a polyanil of the general formula I.

Compounds of the general formula III and processes for their preparation are known per se to a person skilled in the art. Where $R^1$ is alkoxy, it is possible, for example, to start from the corresponding hydroxy compound

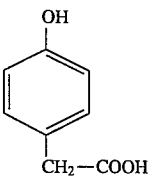

and to convert it into the alkoxy compound by reaction with an alkyl halide.

In the Vilsmeier-Haack-Arnold reaction, dimethylformamide and $POCl_3$ are added to compounds of the general formula III, an amidine or, when, for example, $NaClO_4$ is added, an amidinium salt being formed. The molar ratio of dimethylformamide to the compounds of the general formula III is as a rule from 20:1 to 2:1, preferably from 6:1 to 4:1, and the molar ratio of $POCl_3$ to the compounds of the general formula III is from 5:1 to 1:1, preferably from 4:1 to 2:1. Further information on the Vilsmeier-Haack-Arnold reaction is to be found in Houben Weyl VII/1, [1954], 29–36, Georg Thieme Verlag, Stuttgart.

In a second step, the resulting amidine or amidinium salt can then be converted into the polyanils of the general formula I or into their acid addition salts of the general formula II. For this purpose, the amidine or the amidinium salt is reacted with an aromatic diamine of the general formula $$H_2N-R^2-NH_2.$$

The preferred radicals $R^2$, which were stated in the case of the polyanils, are the consequence of the diamines preferably used here.

The reaction of the amidine or amidinium salt with the aromatic diamine can be carried out in a solvent, for example in an alcohol, preferably an ethanol. The reaction temperatures are as a rule from 10° to 150° C. and the reaction times from 1 to 20 hours. Thereafter, the reaction mixture is cooled and the polyanil formed is isolated, purified and dried.

The molar ratio of aromatic diamine to amidine or amidinium salt is from 1.5:1 to 0.75:1, preferably from 1.1:1 to 0.9:1.

The acid addition salts are prepared by adding acids to the polyanils, the molar ratio of acid to polyanil usually being from 2:1 to 1:1. This reaction is preferably carried out at room temperature.

The novel polyanils have extensive π conjugation, are soluble in toluene, chloroform, dimethylformamide and N-methylpyrrolidone and can be used as finishes, coatings, antioxidants, free radical acceptors and preferably electrically conductive materials.

The electrically conductive compounds are obtained by doping the novel polyanils. Doping may be effected, for example, by chemical methods, as described in Makromol. Synth. I (1977), 571, or Chemie in unserer Zeit, 20th Year, 1986/No. 1, page 10.

Electrochemical doping by anodic oxidation is particularly advantageous. An electrolysis cell which contains a platinum net is used for this purpose, and the novel polyanil in powder form is introduced into said cell. A stainless steel sheet is advantageously used as the cathode. The procedure can be carried out at a current density of from 0.05 to 100 $mA/cm^2$. The electrolysis cell is loaded with an electrolyte solvent and with a conductive salt. Examples of suitable electrolyte solvents are nonaqueous solvents, such as acetone, acetonitrile, dimethylformamide, dimethyl sulfoxide, methylene chloride and propylene carbonate. However, water or mixtures of water with those solvents which are water-miscible, as well as emulsions of the conductive salts in water, may also be used. The concentration of the conductive salts is advantageously from 0.01 to 0.1 mol/l.

$BF_4^-$, $R\text{-}SO_3^-$, $AsF_6^-$, $SbF_6^-$, $SbCl_6^-$, $ClO_4^-$, $HSO_4^-$ and $SO_4^{2-}$ have proven advantageous anions for the conductive salt. A further group of conductive salt anions is derived from aromatics having acidic groups. These include the $C_6H_5COO^-$ anion and in particular the anions of unsubstituted or alkyl-substituted aromatic sulfonic acids.

Suitable cations in the conductive salts are, for example, alkali metal or alkaline earth metal cations, such as lithium, sodium and potassium. However, ammonium cations may also be present in the conductive salts. The acids which contain conductive salt anions may sometimes be used.

Doping of the novel copolymers with the conductive salt anions takes from about 10 to 120 minutes. After this procedure, electrically conductive polymers are obtained.

The novel polyanils can also be used as nonlinear optical (NLO) materials. A general, nonlinear optical materials are used by means of various thin-film methods which are employed in the electronics industry for the production of thin films on various substrates. A relatively simple process for the production of films for optical materials is the spin-coat process. This method leads to homogeneous, transparent films which are composed of either pure nonlinear optically active materials or a mixture of transparent matrix polymer and NLO material. To realize this process technically, the substances to be applied as a coat must be dissolved homogeneously either in pure form or in combination with a polymer. The thickness of the film obtained in the spincoat process is dependent on the theological properties of the solutions and on the speed of rotation of the substrate during coating.

For the production of films having thicknesses of >1 μm, knife-coating or casting methods may also be used. As a rule, the films produced in this manner are then dried so that, as far as possible, no cracks form and no inhomogeneities occur.

The novel polyanils, for example in the form of a solution, can be subjected directly to the spin-coat process described above. The solids content of the solutions is, as a rule, from 0.5 to 50, preferably from 0.5 to 15, % by weight.

Transparent organic polymers may be mixed with the novel polyanils. In principle, all polymers which give transparent films are suitable. Useful polymer materials are in general polystyrene, polyvinyl acetate, polyacrylates, non-crystalline polyurethanes, copolyamides and polyimidazoles, but preferably polymethyl methacrylate and polyvinylpyrrolidone. The content of NLO polyols in the mixture is in general from 5 to 95, preferably from 10 to 80, % by weight.

The choice of suitable solvents for the spin-coat process is mainly dependent on the solubility of the NLO material and, if the mixture is used, on the solubility of the transparent polymer. Suitable solvents are, for example, chloroform and N-methylpyrrolidone and also solvent mixtures.

Suitable substrates are in general glass, silicon wafers and transparent polymers, including polymethyl methacrylate and polystyrene.

EXAMPLES

Preparation of

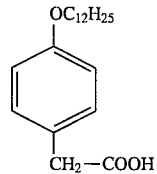 (IIIa)

23.4 g ($\hat{=}$94 mmol) of $C_{12}H_{25}Br$ and 9.54 g ($\hat{=}$170 mmol) of KOH, dissolved in 50 ml of ethanol, were added to 13.0 g ($\hat{=}$85 mmol) of

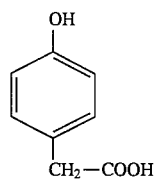

and the mixture was refluxed for 18 hours. Thereafter, 4.77 g ($\hat{=}$85 mmol) of KOH, dissolved in 50 ml of ethanol, were added and refluxing was continued for a further 2 hours. The mixture was then cooled to room temperature and acidified with 250 ml of 2 N HCl, the resulting product was filtered off with suction, washed with water, taken up in diethyl ether, dried with MgSO₄ and isolated, and the residual solvent was removed.

Yield: 22.4 g (82% of theory)

Melting point: 78°–79° C.

$C_{20}H_{32}O_3$: calculated: C 74.96 H 10.06 found: C 75.52 H 10.25

Reaction of IIIa by means of the Vilsmeier-Haack-Arnold reaction to give

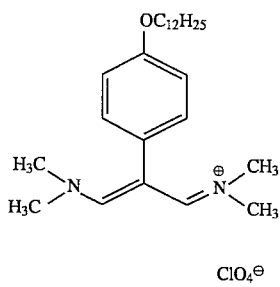

ClO₄⁻

4.25 ml (≙55 mmol) of dimethylformamide were cooled to 0° C. in the absence of moisture, 3.00 ml (≙33 mmol) of POCl₃ were slowly added and the mixture was stirred for 1 hour at room temperature. 3.54 g (≙11 mmol) of IIIa were added and the reaction mixture was kept at 85° C. for 13 hours. After cooling to room temperature, the reaction mixture was added to ice, 1.5 g (≙11 mmol) of NaClO₄ were added while stirring, the product was allowed to crystallize out and the crystals were filtered off with suction and washed with water and diethyl ether.

Yield: 4.02 g (75% of theory)

Melting point: 101°–102° C.

$[C_{25}H_{43}N_2O]ClO_4$ calculated: C 61.65 H 8.90 N 5.75
found: C 61.58 H 8.83 N 5.67

Examples 1 to 4

2 mmol of each of various aromatic diamines, 10 ml of ethanol and 5 drops of glacial acetic acid were added to 0.95 g (≙2 mmol) of the amidinium salt

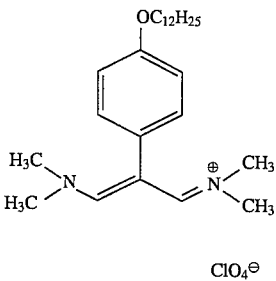

ClO₄⁻ and the mixture was refluxed for 16 hours. After cooling to room temperature, the products formed in each case were filtered off with suction, washed with ethanol and a mixture of ethanol and triethylamine ( molar ratio 10:1 ), dispersed with diethyl ether, filtered off with suction again and dried.

Determination of conductivity 10 mg of each of the polyanils prepared in Examples 1 to 4 were pressed into a platinum net and made the anode. The electrolyte used was a 0.1 molar solution of N⊕(n-butyl)₄BF₄⊖ in acetonitrile. A platinum cathode measuring 3 cm × 3 cm × 0.1 cm was used as the opposite electrode. The samples in the platinum net were charged at a current density of 10 mA/cm² for 60 minutes, after which the platinum net was removed, washed with three times 2 ml of acetone and dried for 10 hours at 75° C. and 20 mmHg, and then measured as a compressed powder at a compressive pressure of 300 atm (gauge pressure).

The inherent viscosity $\eta_{inh}$ was determined in a 0.5% strength by weight solution in dimethylformamide at 23° C.

The table below provides information about the diamines used and the properties of the polyanils formed.

TABLE

| Example | Diamine | Yield n [g] | | Melting point [°C.] | $\eta_{inh}$ [dl/g] | Conductivity [S/cm] |
|---|---|---|---|---|---|---|
| 1 | 0.22 g H₂N—⌬—NH₂ | 15 | 0.37 (46%) | 199–200 | 0.5 | 8 |
| 2 | 0.42 g H₂N—⌬—CH=CH—⌬—NH₂ | 10 | 0.60 | 209–215 | 0.6 | 30 |
| 3 | 0.43 g H₂N—⌬—S—⌬—NH₂ | 20 | 0.45 | 207–211 | 0.7 | 50 |
| 4 | 0.40 g H₂N—⌬—NH—⌬—NH₂ | 10 | 0.40 | 214–220 | 0.37 | 5 |

In Example 1, the elemental analysis gave the following:

calculated: C 78.41 H 9.02 N 6.77 found: C 78.65 H 8.89 N 7.12

Example 5

A thin film of the polyanil obtained according to Example 2 was produced by spin-coating from chloroform. The film thickness was 37 nm. The film absorption exhibited a maximum at 495 nm.

To measure the frequency tripling, expressed by the nonlinear optical susceptibility $x^3$ [esu], a sample was mounted on a holder rotatable from the outside in a vacuum chamber provided with windows transparent to the incident and emergent light. The vacuum chamber was closed and evacuated. An IR pulse whose frequency could be varied from 0.8 to 2.2 μm was focussed on the sample by means of an optical setup consisting of a plurality of mirrors and lenses. The IR pulse was generated by a parametric oscillator pumped by a frequency-tripled Nd-YAG laser. After passage through the sample, a proportion of the light emerged with a tripled frequency. To prevent the light of the tripled waves generated on passage through the sample from undergoing extinction through destructive interference, the distance covered by the light through the sample, ie. the sample thickness, was optimized so that the proportion of the frequency-tripled light exhibited an intensity maximum. This was effected by rotating the sample.

The proportion of light, whose frequency had been tripled after passage through the sample, was separated from the remaining light by means of a double monochromator. The intensity of the frequency-tripled light was measured with the aid of a photomultiplier with a down-circuit digital oscilloscope. The relative intensity thus obtained was then compared with the intensity of a quartz substrate whose $x^{(3)}$ value was known, taking into account the film thickness and absorbence behavior of the sample. It was thus possible to convert the measured value into an absolute $x^{(3)}$ value.

The frequency tripling measurements at 1650 nm gave a $x^{(3)}$ value of $2.1 \times 10^{-11}$ esu.

A film produced in a corresponding manner from mixtures of 50% by weight of the polyanil obtained according to Example 2 and 50% by weight of polymethyl methacrylate gave a $x^{(3)}$ value of $1.2 \times 10^{-11}$ esu in frequency tripling measurements at 1650 nm.

We claim:

1. A polyanil of the formula I

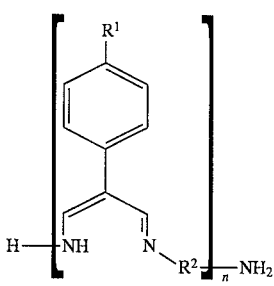

where $R^1$ is $C_1$–$C_{24}$-alkyl, $C_1$–$C_{24}$-alkoxy, Cl, Br, $CF_3$ or $NO_2$, $R^2$ is para-phenylene, a fused aromatic ring system of 10 to 30 carbon atoms or

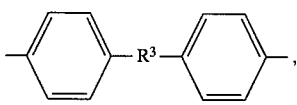

$R_3$ is a chemical bond, S, O, NH, $CH_2$, CH=CH, CO, SO or SS and n is an integer from 5 to 100, and its acid addition salts of the formula II

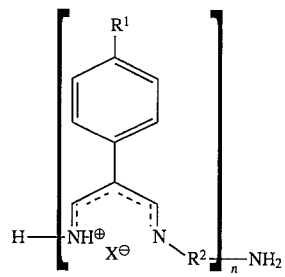

where $X^-$ is $ClO_4^-$, $BF_4^-$, $AsF_6^-$ or

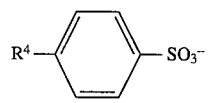

and $R^4$ is $C_1$–$C_8$-alkyl.

2. A process for the preparation of a polyanil as defined in claim 1, wherein, in a first step, a compound of the formula III

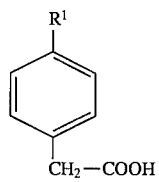

is subjected to a Vilsmeier-Haack-Arnold reaction to give an amidine which is converted in a second step, by the addition of an aromatic diamine, into a polyanil of the formula I.

3. An electrically conductive composition comprising the polyanil defined in claim 1.

4. A nonlinear optical composition comprising the polyanil defined in claim 1.

5. A solution comprising a polyanil as claimed in claim 1.

6. A coated substrate comprising a polyanil as defined in claim 1.

7. An opto-electrical component coated with the polyanil defined in claim 1.

8. A mixture comprising a polyanil as defined in claim 1 and a transparent organic polymer.

9. The mixture defined in claim 8, wherein the transparent organic polymer is selected from the group consisting of polystyrene, polyvinyl acetate, polyacrylates, noncrystalline polyurethanes, copolyamides and polyimidazoles.

10. The mixture defined in claim 9, wherein the transparent organic polymer is a polyacrylate.

11. The mixture defined in claim 9, wherein the transparent organic polymer is polymethyl methacrylate.

* * * * *

UNITED STATES PATENT AND TRADEMARK OFFICE
CERTIFICATE OF CORRECTION

PATENT NO.: 5,530,087

DATED: June 25, 1996

INVENTOR(S): NAARMANN et al.

It is certified that error appears in the above-identified patent and that said Letters Patent is hereby corrected as shown below:

On the cover page:

item [75], "Munich" should read --Muenchen--;

item [30], "42 18 766.4" should read --P 42 18 766.4--.

Signed and Sealed this

Fifteenth Day of October, 1996

Attest:

BRUCE LEHMAN

*Attesting Officer*  *Commissioner of Patents and Trademarks*